Figure 1:
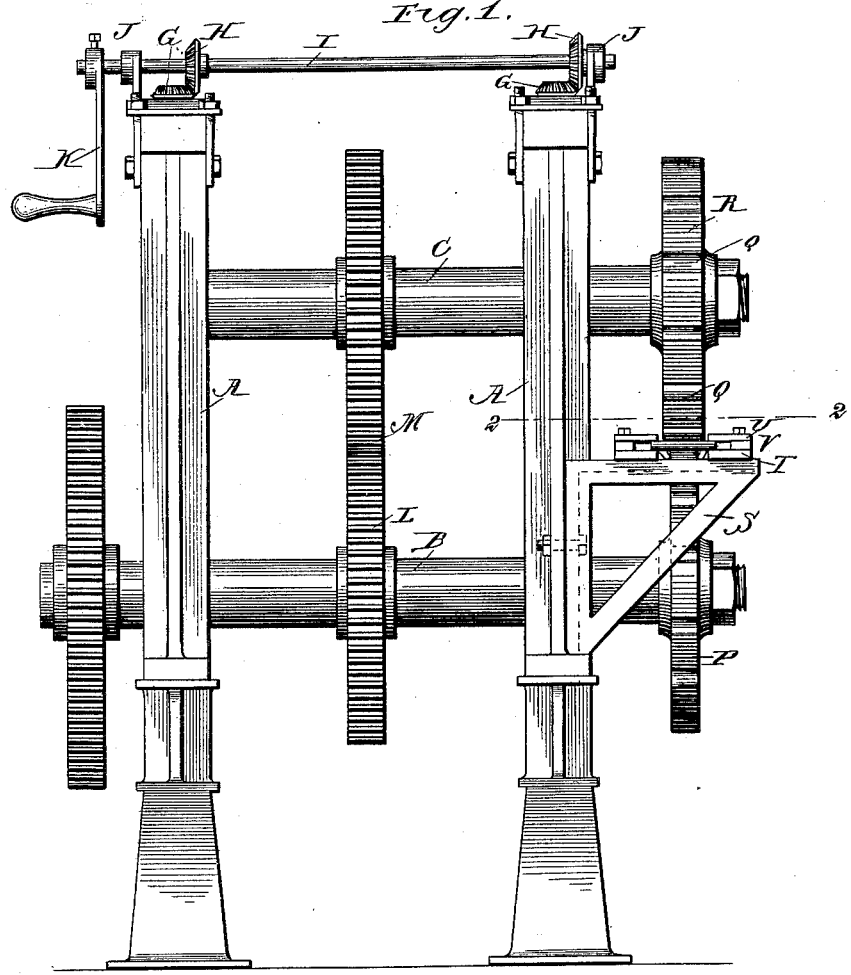

(No Model.) 2 Sheets—Sheet 1.

D. D. McKERNAN.
MACHINE FOR UNITING CHAIN LINKS.

No. 394,199. Patented Dec. 11, 1888.

Witnesses.
W. Rossiter
Wm. Rheem.

Inventor
Dennis D. McKernan.
By Jno. G. Elliott.
Atty.

(No Model.) 2 Sheets—Sheet 2.

D. D. McKERNAN.
MACHINE FOR UNITING CHAIN LINKS.

No. 394,199. Patented Dec. 11, 1888.

Witnesses,
W. Rossiter
Wm Rheem

Inventor,
Dennis D. McKernan
By Jno. G. Elliott
Atty.

UNITED STATES PATENT OFFICE.

DENNIS D. McKERNAN, OF CHICAGO, ILLINOIS, ASSIGNOR TO THE STEEL KEY CHAIN COMPANY, OF SAME PLACE.

MACHINE FOR UNITING CHAIN-LINKS.

SPECIFICATION forming part of Letters Patent No. 394,199, dated December 11, 1888.

Application filed May 29, 1888. Serial No. 275,480. (No model.)

*To all whom it may concern:*

Be it known that I, DENNIS D. MCKERNAN, a citizen of the United States, and a resident of Chicago, in the county of Cook and State of Illinois, have invented certain new and useful Improvements in Machines for Uniting Link-Chains, of which the following is a specification.

This invention relates to improvements in machines for uniting link-chains, and is especially designed for operating upon a chain the links of which are provided with hooks not cast in permanent form, the said links being united with adjacent links by bending or closing the lips of the hook over a key which constitutes a portion of the bearing of an adjacent link, or over the end or cross-bar of said link.

The prime object of the invention is to lessen the expense of manufacturing link-chains by providing an automatic self-feeding machine for uniting the links thereof by bending the lips of the link-hooks, which hooks are cast generally U-shaped, and therefore not in permanent form, and when so formed may be cast without the use of cores in molding, and consequently at a materially less cost, the said links being afterward rapidly connected and the hooks thereof bent in permanent form by one and the same operation of this improved machine.

Another object is to have in such a machine opposing rotating locking-wheels for uniting the links of the chain provided with registering peripheral notches, which in one of said wheels are adapted to receive and support the hook of a link while the other is bending or locking the lips thereof, whereby the continuous rotation of said wheels operates to automatically feed the chain and lock the links thereof during its passage between said wheels, whereby, when the unlocked links are placed together by hand in consecutive order, any desired length of chain may be formed.

Another object is to facilitate the automatic self-feeding of the unlocked links by providing a guide and support for said chain during its passage through the machine, whereby the chain will remain at all times in a straight line, whether the links are locked or not, thereby insuring a perfect action of the rotary locking-wheels and avoiding any interference with the flexibility of the chain as a whole.

I attain these objects by the devices illustrated in the accompanying drawings, in which—

Figure 2:
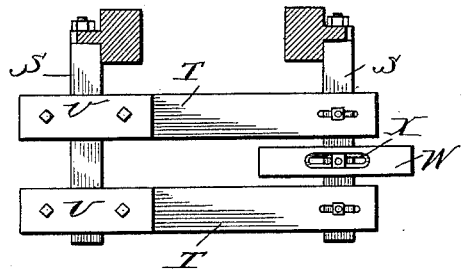
Figure 3:
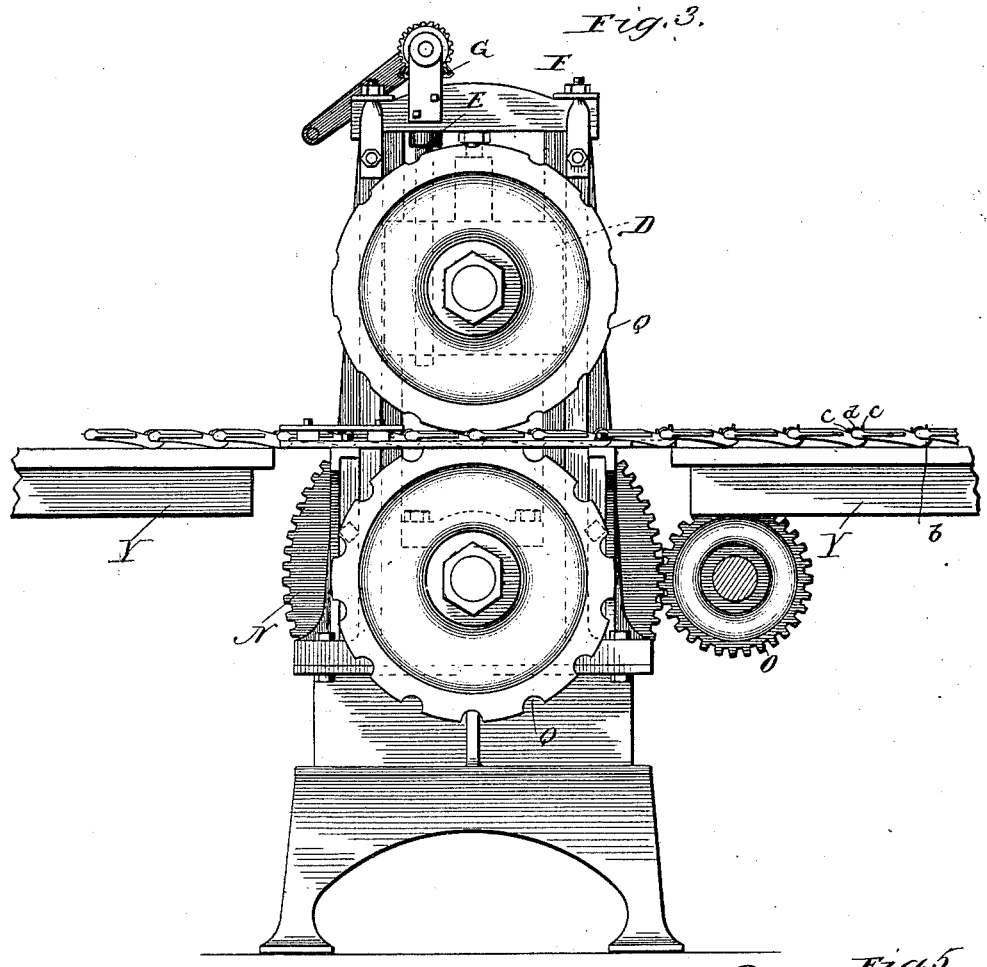
Figure 4:
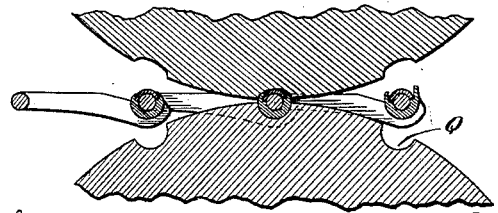

Figure 1 represents a side elevation of a machine embodying my invention; Fig. 2, a detail horizontal section on the line 2 2 of Fig. 1; Fig. 3, a front elevation; Fig. 4, a detail vertical section through the locking-wheels, showing links therebetween in the act of being united; and Fig. 5, a detail perspective of one form of link, upon which my machine is especially designed to operate.

Similar letters of reference indicate the same parts in the several figures of the drawings.

Referring by letter to the accompanying drawings, A indicates the vertical end frames of my machine, adapted for supporting the operative parts thereof, in which are journaled shafts B C, one above the other, the lower and power shaft, B, having fixed bearings, while the upper shaft, C, journals in adjustable bearings, consisting of sliding boxes D. (Shown by dotted lines in Fig. 3.) These boxes are adjustable vertically in said frames by means of screw-shafts E, one end of which works therethrough, while the opposite ends are journaled in and project through the cross-head F of said frames, upon which ends are secured small bevel-gears G, with which mesh corresponding bevel-gears, H, mounted on a shaft, I, journaled in brackets J, secured to said frames, to one end of which is secured a crank-handle, K, by means of which a rotary motion is imparted to said shaft I, and the sliding boxes thereby adjusted vertically to the desired point.

The shafts B and C between the frames are connected by cog-wheels L M, mounted thereon, and power is applied to the shaft B by means of a cog-wheel, N, secured to one end thereof beyond the frame, with which gears a smaller cog, O, to which the initial power is applied in any well-known and convenient manner, and by means of which a proper speed is imparted to the power-shaft.

Upon the opposite and front end of the power-shaft B is mounted a locking-wheel, P, provided with semicircular peripheral notches Q, into which fit the hooks of the links, and immediately above this wheel, upon the end of the shaft C, is mounted the other locking-wheel, R, also provided with peripheral notches, corresponding in number and arranged to register with the notches in the lower wheel, P, the said notches, however, in this case not being semicircular, the object of which will be explained farther on.

To the frame of the machine, at each side of the lower locking-wheel, are secured brackets S, upon which is supported the guide for the link-chain in its passage through the machine between said locking-wheels, consisting of two parallel bars, T, to one end of which, and to one side of the locking-wheels, are mounted short bars U, elevated above the bars T by filling-blocks V, so as to leave a horizontal passage between said bars on the inside thereof, in which the sides of the links travel after being operated upon by the locking-wheels. On the opposite side of said wheels, lying between and flush with the bars T, is a bar, W, secured to the bracket and made adjustable thereon by means of a slot, X, in said bar, through which works a screw-bolt engaging the bracket, the inner end of which adjustable bar projects as far in between the locking-wheels as is necessary to support the unlocked links until they are engaged and supported by the locking-wheels.

The ends of work benches or tables Y are placed as close as practicable to the ends of the guides, so as to form a continuation thereof, and therefore a continuous support for the link-chain on each side of the machine, both before and after the links are united, thereby maintaining the chain throughout its length in a perfectly straight line, so as not to affect the operation of the wheels upon the chain.

Figure 5:
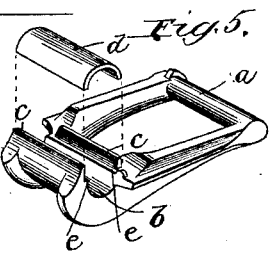

In Fig. 5 I have illustrated the preferred form of link, upon which such a machine is especially designed to operate, which links have heretofore been cast with the hooks in permanent form, and then united by hand, not only involving a very laborious and expensive operation, but also incurring the liability of imperfect casting, and the additional expense of the use of a core to form the permanent hook; and I am qualified to state that such is the fact, because I invented the devices—Letters Patent of the United States No. 258,863, granted to me on the 30th day of May, 1882—for the manufacture of such a chain. By reason of the employment of this machine, however, I am enabled to have the links of this chain cast in malleable metal, with the usual cross-bar, $a$, at one end, which constitutes its pivot with the adjacent link, and at its opposite end the U-shaped bearing socket or hook $b$, provided with upwardly-projecting lips $c$, the said hook constituting the lower half of the bearing of the cross-bar of another adjacent link, the upper half of which bearing is formed by a semicircular plate or steel key $d$, resting upon the ledges $e$ at the edges of the bearing-surface of the hook below the lips thereof.

In order to unite the links of such a chain, the cross-bar of one link is first placed in the bearing socket or hook of the adjacent link, the steel key set in place, covering said bar, and the lips $c$ then bent down over the key, so as to lock it firmly in position, the arch of said key rendering it sufficiently strong to prevent its being flattened down and binding upon the cross-bar of the adjacent link.

In the practical operation of my machine the upper locking-wheel is first elevated, the links of the chain connected together by hand, and the keys set in proper position upon the end bars of the link within the hook, this unlocked portion of the chain extending to one side of the machine and in a line with the locking-wheels, after which the first pair of links is moved forward in position to be engaged by said wheels, the upper locking-wheel then brought down in proper position to bend the lips properly, and the machine is started. The lower surface of the bearing socket or hook of each link, as soon as it leaves the adjustable guide-bar W, will drop into one of the semicircular sockets in the periphery of the lower wheel, so as to be supported thereby during the locking operation and drawn forward through the machine, the notch in the upper locking-wheel, immediately after the link sets in the notch in the lower wheel, registering therewith, and being so shaped as to encompass the projecting lips on the link and force them toward each other down upon the steel key, thereby effectually locking the key in position and the links together, and at the same time feeding the chain forward, the notches in said locking-wheels being located a distance apart corresponding to the length of the links, and hence it will be necessary to have a different set of wheels for the different sizes of links; and for the same reason it is necessary that one of said wheels should be adjustable, so as not to exert too great a pressure upon the key in bending down the lips. The notches in the upper wheel, however, are so shaped as to just encompass the lips, with sufficient room on each side of the center of the notch, when said center engages the top of the key, to force the lips firmly against the back of the key, but without exerting any pressure whatever on the center of the key.

By means of this machine the cost of manufacture of link-chains made or cast with U-shaped hooks, as herein described, is very materially reduced, not only by reason of lessening the actual expense of molding the links, but also by increasing the quantity of chain-links which can possibly be connected together within a given time; and I may state, in conclusion, that so far as the operation of this machine is concerned, it is immaterial whether a key such as I have shown and described be employed, for the bending of the lips on the hook could be accomplished without such a device.

Having described my invention, what I claim, and desire to secure by Letters Patent, is—

1. In a machine for uniting link-chains, the opposing locking-wheels provided with peripheral notches adapted and arranged to register with each other, in combination with means for rotating said wheels, substantially as described.

2. In a machine for uniting link-chains, the opposing rotating locking-wheels provided with peripheral notches arranged to register with each other, in combination with adjustable bearings for one of said wheels, and a chain-guide for supporting the unlocked chain, substantially as described.

3. In a machine for uniting link-chains, the opposing rotating locking-wheels provided with peripheral notches and adjustable bearings for one of said wheels, in combination with the adjustable support W to one side of said wheel, and the chain-guides T U at the opposite side of said wheel, substantially as described.

DENNIS D. McKERNAN.

Witnesses:
A. M. BENNETT,
WILL R. OMOHUNDRO.